United States Patent [19]

Gembus et al.

[11] Patent Number: 4,577,659
[45] Date of Patent: Mar. 25, 1986

[54] COUPLING ARRANGEMENT FOR PIPE CONDUITS CONDUCTING A MEDIUM CONTAINING RADIOACTIVE SUBSTANCES

[75] Inventors: Hans-Dieter Gembus, Pattensen; Rainer Wolf, Weingarten, both of Fed. Rep. of Germany

[73] Assignee: Deutsche Gesellschaft für Wiederaufarbeitung von Kernbrennstoffen mbH, Hanover, Fed. Rep. of Germany

[21] Appl. No.: 663,383

[22] Filed: Oct. 22, 1984

[30] Foreign Application Priority Data

Oct. 21, 1983 [DE] Fed. Rep. of Germany ....... 3338241

[51] Int. Cl.[4] .................. F16L 37/28; F16L 27/12
[52] U.S. Cl. ................. 137/614.06; 137/614.01; 137/637.05; 251/149.9; 285/300; 285/301
[58] Field of Search ............ 137/614, 614.01, 614.05, 137/614.06; 251/142, 149.9, 148, 150; 285/299, 300, 301, 302, 226

[56] References Cited

U.S. PATENT DOCUMENTS

| 337,037 | 3/1886 | White | 285/301 |
| 381,825 | 4/1888 | Brinkerhoff | 285/299 |
| 2,872,216 | 2/1959 | Kaiser | 251/149.9 |
| 3,298,680 | 1/1967 | Jablin | 285/300 |
| 4,335,747 | 6/1982 | Mitsumoto et al. | 137/614.06 |
| 4,416,305 | 11/1983 | Commette et al. | 137/614 |

Primary Examiner—A. Michael Chambers
Attorney, Agent, or Firm—Walter Ottesen

[57] ABSTRACT

The invention is directed to a coupling arrangement for pipe conduits through which a medium containing radioactive or toxic substances is conveyed. The coupling arrangement includes a first coupling unit mounted on the end of a first one of the pipe conduits. A conduit engaging assembly is mounted at the end of the second one of the pipe conduits and includes an inner conduit segment tightly connected to and aligned with the second pipe conduit. A tubular member is arranged in surrounding relationship to the inner conduit segment so as to be coaxial therewith. The tubular member has a forward free end facing toward the first coupling unit and a second coupling unit is mounted on the forward free end of the tubular member and is joinable to the first coupling unit. Each of the coupling units includes a valve which is movable between a first position for blocking the flow of medium and a second position for defining a clear through bore communicating with the first and second pipe conduits when the coupling units are joined together. The conduit engaging assembly further includes a device for displacing the tubular member and the inner conduit segment relative to each other so as to cause the inner conduit segment to penetrate and pass through the bores of the valves thereby establishing a clear through connection between the first and second pipe conduits to permit the passage of the medium from one of the pipe conduits to the other one of the pipe conduits. In this way, there are no contaminated surfaces on the outside of the coupling units after the inner conduit segment has been withdrawn and when each of the valves has been rotated to its first position.

8 Claims, 6 Drawing Figures

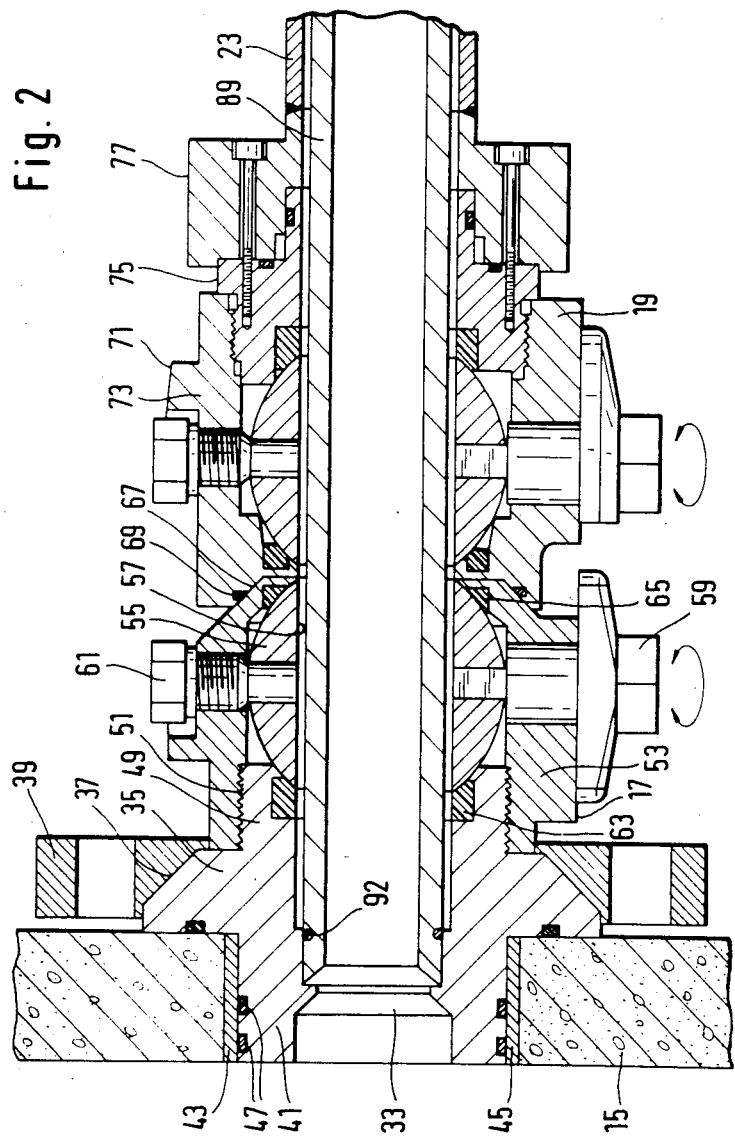

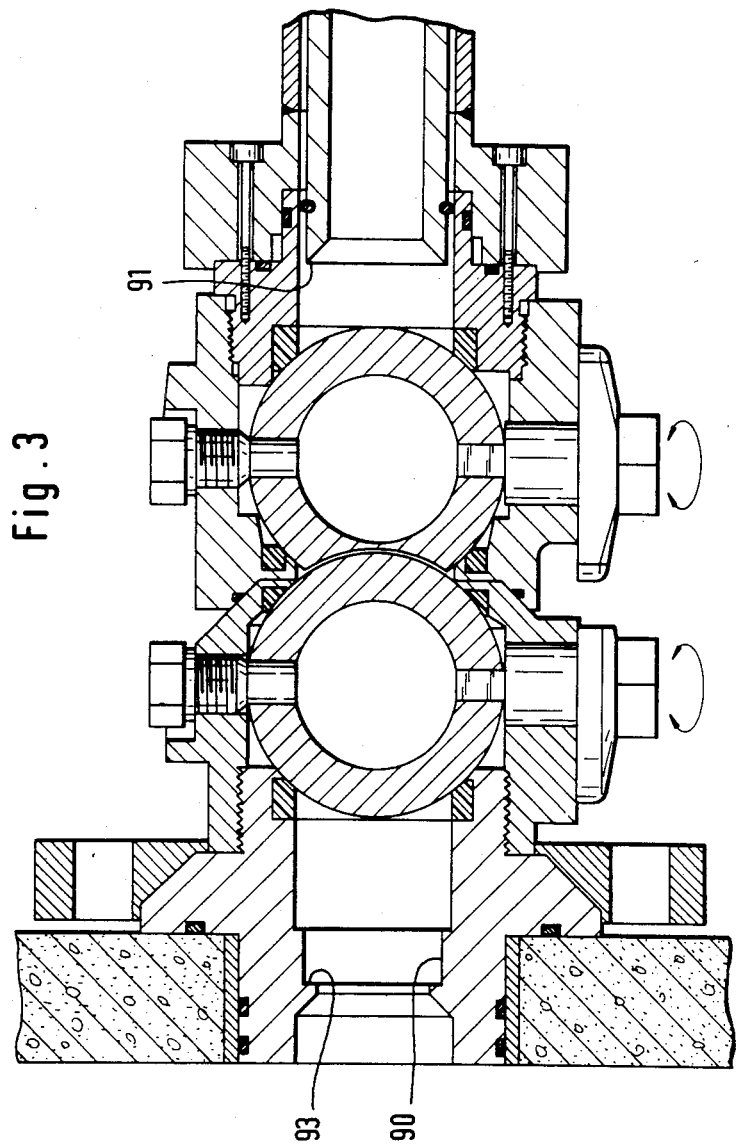

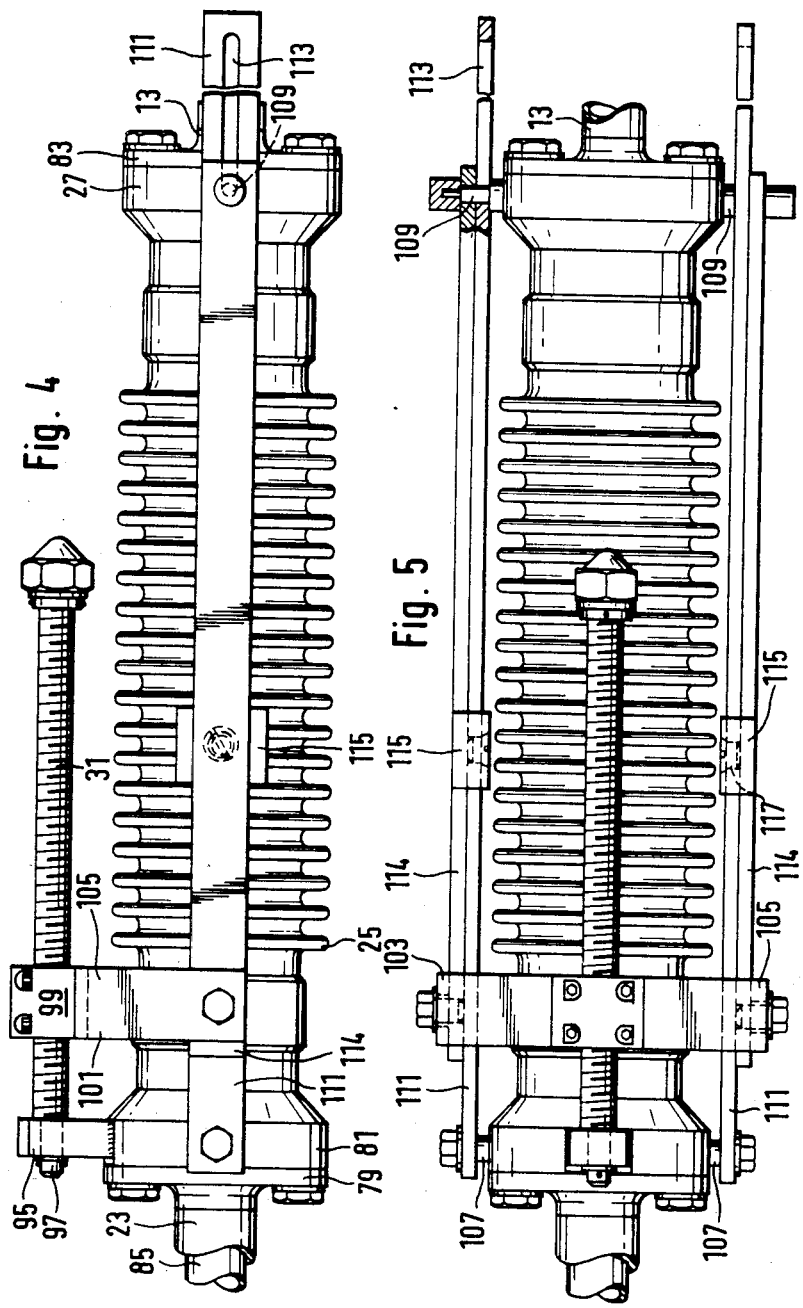

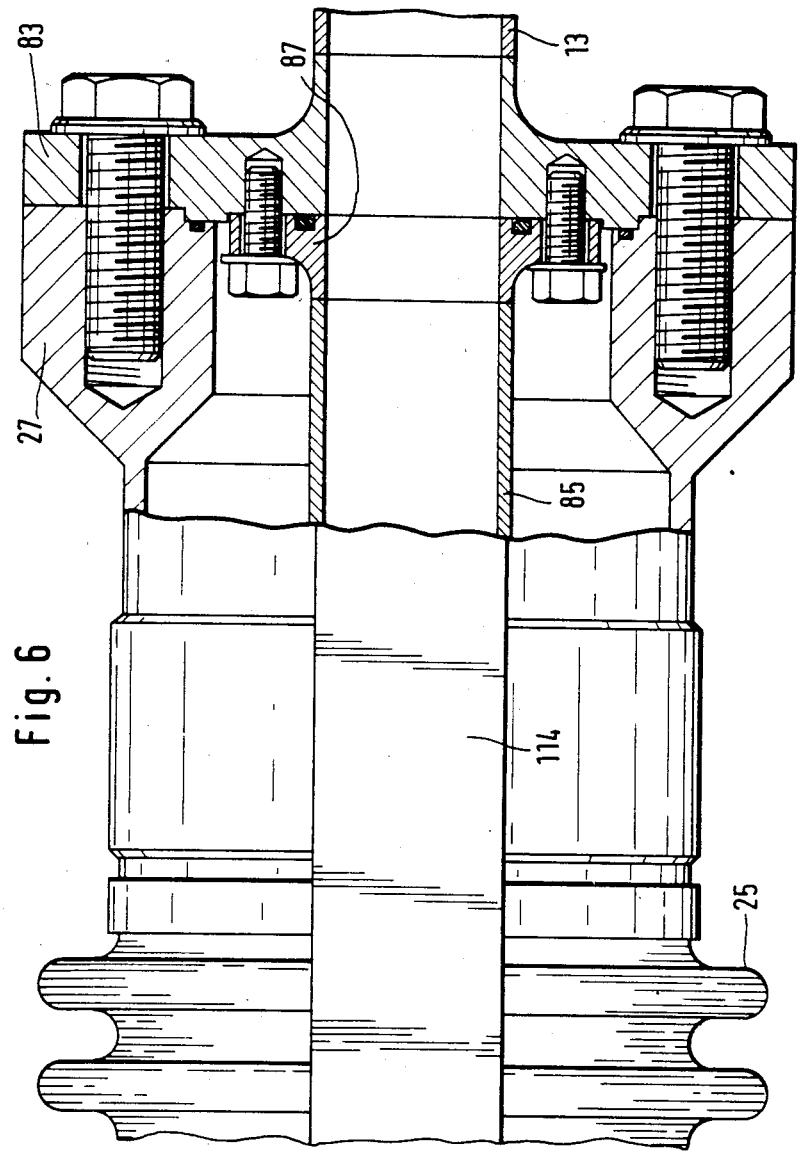

COUPLING ARRANGEMENT FOR PIPE CONDUITS CONDUCTING A MEDIUM CONTAINING RADIOACTIVE SUBSTANCES

FIELD OF THE INVENTION

The invention relates to a coupling arrangement for joining two pipe conduits together for conducting a medium containing toxic or radioactive materials therethrough. The arrangement includes two coupling units corresponding to respective ones of the conduit ends to be connected together. Valves are arranged in corresponding ones of the units for blocking the flow of the medium or passing the flow thereof.

BACKGROUND OF THE INVENTION

Coupling arrangements are used when radioactive liquids are drawn off from a storage tank into a transporting container. If the radioactive liquid has to be taken out of a storage tank and filled into a transporting container, then the tank has to be connected to the container by pipe conduits. The two conduits are connected by a coupling arrangement which includes two coupling units. One unit is mounted on a flexible pipe conduit connected to the transporting container. The other unit may be fixed externally in a wall of the shielding cell, in the cover of the storage tank, in the wall of the tank or at the end of a pipe conduit connected to the tank. The two coupling units are put together and joined by suitable clamping members. There is a shut-off device in the form of a ball valve in each of the two coupling units to block the conduit corresponding thereto.

When the radioactive liquid is drawn off, it impinges on the inside of the coupling unit so that the coupling units are contaminated when they are uncoupled. For this reason, coupling units with shut-off devices have already been provided which, after the connection has been interrupted and the shut-off devices are in the closed position, do not have any externally exposed surfaces that have come into contact with the radioactive materials which flowed through the coupling unit while the unit was in use. However, these coupling units are of very complex configuration and are very expensive.

A coupling arrangement of the type described above is disclosed in German published patent application No. DE-OS 24 47 357. With the use of this coupling arrangement, it is intended that there be no contact with the toxic materials once the coupling unit has been separated. According to the solution disclosed, this is achieved by providing a connection for a rinsing medium pipe in each shut-off device. The shut-off devices in this arrangement are in the form of ball valves. Before the coupling arrangement is separated, the inner parts of the two coupling units are rinsed, thereby cleaning the parts of the unit which have come into contact with the medium conveyed.

SUMMARY OF THE INVENTION

It is an object of the invention to provide a coupling arrangement of the kind described above at low cost and configured in such a way that when the coupling arrangement has been separated, the coupling units do not have any contaminated external surfaces and thereby make the rinsing process unnecessary.

The coupling arrangement of the invention is for joining two pipe conduits to each other for conducting a medium containing toxic or radioactive materials therethrough. The arrangement includes a first coupling unit mounted on the end of a first one of the pipe conduits and a conduit engaging assembly mounted at the end of the second one of the pipe conduits. The conduit engaging assembly includes an inner conduit segment tightly connected to and aligned with the second pipe conduit; a tubular member arranged in surrounding relationship to the inner conduit segment so as to be coaxial therewith, the tubular member having a forward free end facing toward the first coupling unit; and, a second coupling unit mounted on the forward free end of the tubular member which is joinable to the first coupling unit. Each of the coupling units includes a shut-off device in the form of a valve movable between a first position for blocking the flow of the medium and a second position for defining a clear through bore communicating with the first and second pipe conduits when the coupling units are joined together. The conduit engaging assembly further includes displacing means for displacing the tubular member and the inner conduit segment relative to each other so as to permit the inner conduit segment to penetrate and pass through the bores of the valves thereby establishing a clear through connection between the first and second pipe conduits to allow the passage of the medium from one of the pipe conduits to the other one of the pipe conduits.

If radioactive liquid has to be drawn from a storage tank, the two coupling units at the ends of the pipe conduits to be joined are connected with each other. The two shut-off valves in the coupling units are opened to place the through bores in alignment with each other. The outer tubular member and the inner conduit segment of the conduit engaging assembly are shifted relative to one another. In this process, the end of the inner conduit segment passes through the bores of the two shut-off valves and forms a seal with the sealing surface in the coupling unit of the other pipe conduit. The two coupling units are thus penetrated by the end portion of the inner conduit segment.

The radioactive liquid is conveyed through the inner conduit segment by partial vacuum. Accordingly, the parts of the coupling units and the shut-off valves thereof do not come into contact with the medium conveyed during the drawing off process. Contamination of the parts of the coupling arrangement is thus not possible. This ensures that toxic materials are prevented from reaching the ambient when the coupling units are separated from each other.

An advantageous embodiment of the invention is provided by the feature of a tubular segment forming part of the tubular member. The tubular segment is configured so as to be changeable in length and actuating means are provided for changing the length of the tubular segment thereby displacing the tubular member relative to the inner conduit segment. By shortening the outer tubular member by means of the tubular segment of variable length, the inner conduit segment is slid through the flow bores of the coupling units. If the displacement or length-changing means is used in the opposite direction, the outer tubular member is reextended and the inner conduit segment is drawn back into the latter.

According to a further advantageous embodiment of the invention, the tubular segment of variable length is a metal bellows inserted in the outer tubular member.

The bellows very effectively provides the necessary change in the length of the outer tubular member.

According to still another feature of the invention, a preferred configuration of displacement or length-changing means for the tubular segment of the tubular member includes a pair of guide bars and a pair of pull-push bars that assure that the displacement means is resistant to bending. A bracket is connected to the push-pull bars and is displaceable in the direction of the longitudinal axis of the tubular member for shortening or lengthening the bellows as required.

BRIEF DESCRIPTION OF THE DRAWING

The invention will now be explained with reference to the accompanying drawing wherein:

FIG. 2 is drawn to a larger scale than FIG. 1 and is a section view through the coupling arrangement of the invention and showing part of the conduit engaging assembly with the length-changing device omitted;

FIG. 3 shows, in section, the coupling arrangement of FIG. 2 with the shut-off devices in the closed position;

FIG. 4 is a side elevation of the length-changing device of the conduit engaging assembly;

FIG. 5 is a plan view of the length-changing device of FIG. 4; and,

FIG. 6 is drawn to a scale larger than FIG. 5 and is broken out therefrom to show a portion of the length-changing device.

DESCRIPTION OF THE PREFERRED EMBODIMENTS OF THE INVENTION

Figure 1:
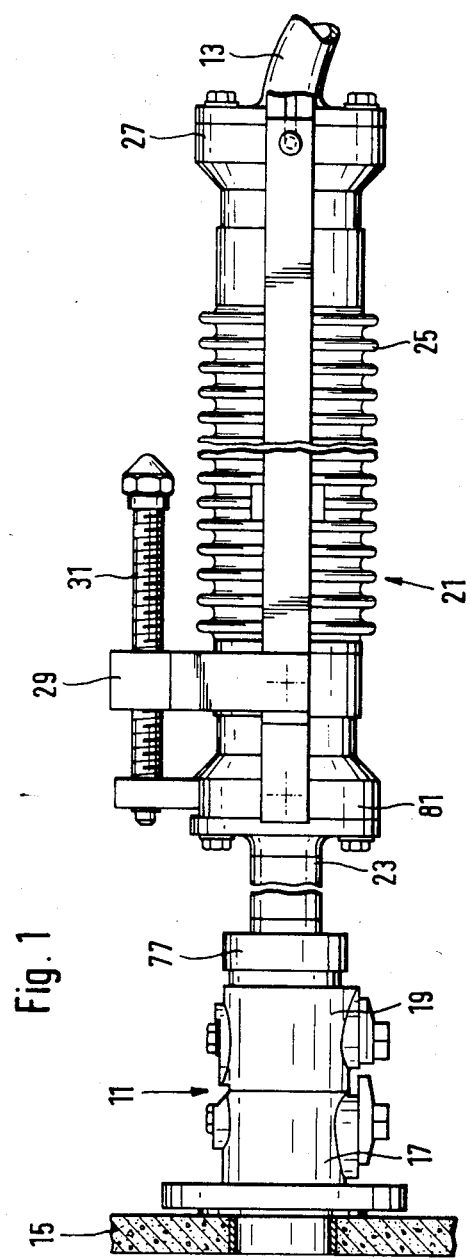
FIG. 1 is a side elevation view of a coupling arrangement of the invention shown in the coupled condition with two pipe conduits joined together and one coupling unit is mounted in the wall of a shielding cell.

A coupling arrangement connects a flexible pipe conduit 13, leading to a transporting container (not shown), to a rigid pipe conduit which, in turn, is connected to a storage tank (not shown). The stationary pipe conduit terminates in a coupling unit 17 of the coupling assembly 11 and is seated in a cell wall 15 from the outside. In the drawing, the stationary coupling unit 17 is tightly connected to a coupling unit 19 located at the end of the flexible pipe conduit 13 by means of a clamping arrangement (not shown).

The flexible pipe conduit 13 has a conduit engaging assembly which is of coaxial configuration and has an end region 21. A metal bellows 25 is arranged in the outer tubular member 23 at the end region 21. The end of the bellows facing away from the coupling assembly 11 is fixedly connected to the flexible pipe conduit 13 by a flange 27. A length-changing device 29 for varying the length is mounted in surrounding relationship to the bellows 25 and is operable by means of a threaded spindle 31.

The stationary coupling unit 17 (FIG. 2) has a flange 35 containing a central flow bore 33. The flange 35 is fixed to the cell wall 15 by a ring 39 which engages the flange over a conical side surface 37. The flange 35 has a central extension 41 which projects into an opening 45 in the cell wall 15 which is clad with a bushing 43. Annular seals 47 at the periphery of the extension 41 of the flange 35 provide a seal.

At the side facing away from the cell wall 15, the flange 35 has a further central extension 49 on which an external thread 51 is formed. A ball valve body 53 threadably engages the thread 51 and has a ball plug 55 rotatably mounted therein. The plug 55 has a central flow bore 57 which can be brought into alignment with the flow bore 33 by rotating the plug 55 by means of an actuating member 59. The plug 55 is journalled for rotation by means of a threadably-mounted bearing pin 61 and is sealed by seating sealing rings 63 and 65 which act on the spherical surface of the ball plug 55.

A clamping arrangement (not shown) presses the coupling unit 19 of the flexible pipe conduit 13 against the stationary coupling unit 17 at a conical centering surface 67 whereat an annular seal 69 is provided. The ball valve 71 of the coupling unit 19 is of the same configuration as the ball valve 53 of the stationary coupling unit 17. The ball valve body 73 threadably engages an annular intermediate piece 75. A first annular flange 77 is threadably fastened on the end of intermediate piece 75 facing away from the ball valve body 73. The outer conduit part 23 is welded to the first annular flange 77.

The outer conduit part 23 has a second annular flange 79 on its other end (FIGS. 4 and 5) which is threadably fastened to an annular end flange 81 of the metal bellows 25. The other annular end flange 27 of the bellows 25 is threadably fastened to an annular flange 83 which is fixedly attached to the flexible pipe conduit 13. An inner conduit segment 85 made of special steel is threadably fastened to the annular flange 83 by means of an annular flange 87 welded to the segment 85 (FIG. 6). The segment 85 is arranged thereby within the metal bellows 25 and the outer conduit part 23 as well as being coaxial with respect thereto. At its other end, the inner conduit segment 85 extends into a ram-like conduit segment 89. The end face 91 of the ram-like conduit segment 89 (FIGS. 2 and 3) is seated on an annular surface 93 of the flange 35 of the stationary coupling unit 17 when the shut-off devices 53 and 71 are in the open position. The annular surface 93 is defined by a constricted portion 90 (see FIG. 3) of the flow bore 33. The ram-like segment of conduit 89 projects into and through the shut-off devices 53 and 71 which are shown in the open position in FIG. 2. The conduit segment 89 has a peripheral annular seal 92 seated at its end portion for sealing when pressed against the surface of the portion 90 of bore 33.

A length changing device 29 is arranged on the metal bellows 25 (FIGS. 4 and 5). The annular end flange 81 of the bellows 25 at the coupling end has a fixed bearing 95 for accommodating a rotatable threaded spindle 31. The spindle 31 is journalled in the bearing 95 by a non-threaded shoulder 97 so as to be parallel with the end portion of the flexible pipe conduit 13. The spindle 31 is guided with its thread through a nut 99 fixed to a U-shaped bracket 101 straddling the bellows 25. The arms 103 and 105 are parallel with and diametrically opposite one another with the bellows 25 disposed therebetween.

The two end flanges 27 and 81 of the bellows 25 each have a pair of diametrically opposed radial pins 107 and 109, respectively. The two pins 107 on the end flange 81 at the coupling end are threadably fastened to the respective ends of guide rails 111 arranged parallel to the bellows 25. The two rails 111 are guided by corresponding ones of the radial pins 109 on the other end flange 27 in respective guide slots 113 of the rails as shown in FIGS. 4 and 5. Bars 114 lie on the outside of corresponding ones of the guide rails 111 and are shorter than the latter. At one end, the bars 114 are connected to respective arms 103 and 105 of the U-shaped bracket member 101 and, at the other end, they are connected to the radial pins 109 of the end flange 27 with aid of appropriate bores formed therein.

A guide rail 111 and bar 114 are superimposed to lie one atop the other at each side of the bellows 25. The superimposed bar and rail are aligned with one another and guided by a guide piece 115 which is properly dimensioned and mounted. The guide piece 115 is fixed by screws 117 against the inner surface of the guide rail 111.

The operation of the apparatus of the invention described above will now be explained.

If radioactive liquid has to be drawn out of a storage tank into a transporting container by suction, the flexible pipe conduit 13 of the transporting container has to be joined to the stationary pipe conduit of the storage tank. This is done by means of the coupling assembly 11, by clamping the two coupling units 17 and 19. When these have been coupled the two shut-off devices 53 and 71 are opened by rotating the square projection 59.

The arrangement 29 for varying the length is operated by rotating the threaded spindle 31. The bellows 25 is compressed by displacing the end flange 27 towards the coupling assembly 11. This leads to a change of length between the inner conduit segment 85 and the outer tubular member 23. Consequently the tubular ram 89 of the inner conduit segment 85 moves through the opened ball plug 55 onto the annular surface 93 of the flange 35 in the cell wall 15. When the end face 91 of the ram 89 and the annular surface 93 of the flange 35 are firmly in contact engagement, the flexible pipe 13 is put under a vacuum and the radioactive liquid is drawn through the inner conduit segment 85 and the flexible pipe conduit 13 into the transporting container.

The vacuum is discontinued when the required amount has been conveyed thereby interrupting the conveying action. The bellows 25 is extended again by operating the threaded spindle 31 in the opposite direction of rotation. The change in length between the inner conduit segment 85 and the outer tubular member 23 is cancelled. This causes the tubular ram 89 to be pulled out of the coupling assembly 11. The shut-off devices 55 and 71, which have not been wetted by the radioactive liquid, can thereafter be closed by rotating the ball plugs 55. The coupling assembly 11 is uncoupled and the external surfaces of the coupling units 17 and 19 are not contaminated.

It is understood that the foregoing description is that of the preferred embodiments of the invention and that various changes and modifications may be made thereto without departing from the spirit and scope of the invention as defined in the appended claims.

What is claimed is:

1. A coupling arrangement for joining two pipe conduits to each other for conducting a medium containing toxic or radioactive materials therethrough, the arrangement comprising:
a first coupling unit mounted on the end of a first one of the pipe conduits;
a conduit engaging assembly mounted at the end of the second one of said pipe conduits, said conduit engaging assembly including:
an inner conduit segment tightly connected to and aligned with said second pipe conduit;
a tubular member arranged in surrounding relationship to said inner conduit segment so as to be coaxial therewith, said tubular member having a forward free end facing toward said first coupling unit; and,
a second coupling unit mounted on said forward free end of said tubular member and being joinable to said first coupling unit;
each of said coupling units including valve means movable between a first position for blocking the flow of the medium and a second position for defining a clear through bore communicating with said first and second pipe conduits when said coupling units are joined together; and,
said conduit engaging assembly further including displacing means for displacing said tubular member and said inner conduit segment relative to each other so as to permit said inner conduit segment to penetrate and pass through said bores thereby establishing a clear through connection between said first and second pipe conduits to allow the passage of the medium from one of said pipe conduits to the other one of said pipe conduits.

2. The coupling arrangement of claim 1, each of said coupling units including a housing defining a channel communicating with said pipe conduits, said valve means being a ball valve rotatably mounted in said channel, said bore being formed in said ball valve and being in alignment with said inner conduit segment when said ball valve is in said second position, said bore having an inner diameter greater than the outer diameter of said inner conduit segment.

3. The coupling arrangement of claim 2, comprising sealing means for sealing said inner conduit segment with respect to the wall surface of said channel in said first coupling unit at a location behind said ball valve thereof when viewed from the location whereat said coupling units are joined.

4. The coupling arrangement of claim 3, said sealing means comprising a sealing surface formed on the wall of said channel of said first coupling unit and a sealing ring mounted on the free end of said inner conduit segment for contact engaging said sealing surface after said free end has penetrated and passed through said bore of said ball valve of said first coupling unit.

5. The coupling arrangement of claim 1, said tubular member and said inner conduit segment having respective ends facing away from said second coupling unit, said tubular member and said inner conduit segment being fixedly attached to said second pipe conduit and to each other at said last-mentioned ends thereof; and, said displacing means including a longitudinally extending tubular segment forming part of said tubular member, said segment being configured so as to be changeable in length; and, actuating means for changing the length of said tubular segment thereby displacing said tubular member and said inner conduit segment relative to each other.

6. The coupling arrangement of claim 5, said actuating means being arranged at the rearward portion of said tubular member away from said second coupling unit.

7. The coupling arrangement of claim 5, said tubular segment being a metal bellows, said actuating means being connected to said tubular member so as to collapse or extend said bellows thereby displacing said tubular member relative to said inner conduit segment.

8. The coupling arrangement of claim 5, said tubular segment including two end flanges and a metal bellows disposed between and connected to said end flanges, each of said flanges having a pair of pins mounted thereon, said pins being disposed on said flange so as to be diametrically opposite each other; said displacing means further including: two guide rails arranged on respective sides of said tubular segment and being fixedly connected to respective ones of said pins of one of said end flanges at respective ends of said rails, said rails having respective slotted ends at the other ends thereof for slideably engaging corresponding ones of the pins on the other one of said end flanges; a first bracket attached to one of said end flanges; two bars arranged adjacent respective ones of said guide rails, said bars being fixedly connected to the pins of said other end flange; a U-shaped bracket having two legs straddling said bellows and being connected to respective ones of said bars at the outer ends of said legs thereof; an internally threaded member fixedly attached to said U-shaped bracket; a threaded spindle arranged parallel to said bellows and threadably engaging said threaded member and being rotatably journalled in said first bracket whereby a rotational movement of said spindle causes said bellows to expand or contract and further causes a displacement of said tubular member relative to said inner conduit segment.

* * * * *